United States Patent
Weiberle et al.

(10) Patent No.: US 9,061,673 B2
(45) Date of Patent: Jun. 23, 2015

(54) BRAKE SYSTEM FOR A VEHICLE AND METHOD FOR OPERATING A BRAKE SYSTEM FOR A VEHICLE

(75) Inventors: Reinhard Weiberle, Vaihingen/Enz (DE); Timo Jahnz, Hessigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 168 days.

(21) Appl. No.: 13/812,034

(22) PCT Filed: May 30, 2011

(86) PCT No.: PCT/EP2011/058830
§ 371 (c)(1),
(2), (4) Date: Apr. 3, 2013

(87) PCT Pub. No.: WO2012/013391
PCT Pub. Date: Feb. 2, 2012

(65) Prior Publication Data
US 2013/0181506 A1     Jul. 18, 2013

(30) Foreign Application Priority Data
Jul. 28, 2010   (DE) .................... 10 2010 038 555

(51) Int. Cl.
*B60T 13/74*   (2006.01)
*B60T 13/58*   (2006.01)
*B60T 7/04*    (2006.01)
(Continued)

(52) U.S. Cl.
CPC ............... *B60T 13/586* (2013.01); *B60T 7/042* (2013.01); *B60T 8/4077* (2013.01); *B60T 13/662* (2013.01); *B60T 13/745* (2013.01); *B60T 7/06* (2013.01); *B60T 13/66* (2013.01)

(58) Field of Classification Search
USPC ............... 303/114.1; 188/345, 358, 360–362; 60/547.1, 548–594
See application file for complete search history.

(56) References Cited

U.S. PATENT DOCUMENTS 5,031,972 A * 7/1991 Steinhauser et al. ....... 303/115.2
5,188,431 A * 2/1993 Gautier ............................ 303/4
(Continued)

FOREIGN PATENT DOCUMENTS

CN        1978256        6/2007
DE     195 43 583       11/1995
(Continued)

OTHER PUBLICATIONS

International Search Report for PCT/EP2011/058830, dated Sep. 26, 2011.

*Primary Examiner* — Christopher Schwartz
(74) *Attorney, Agent, or Firm* — Kenyon & Kenyon LLP (57) ABSTRACT

A brake system includes: a brake actuating element; a first piston-cylinder unit having a first piston displaceable by the brake actuating element actuated by at least a predefined minimum actuation such that a first internal pressure in the first piston-cylinder unit is increased; at least one wheel brake cylinder having a brake pressure which is increased using the increased first internal pressure; a first brake booster; and a second piston-cylinder unit having a second piston displaceable by the first brake booster so that a second internal pressure in the second piston-cylinder unit is increased, and to which the at least one wheel brake cylinder is hydraulically connected such that the brake pressure of the at least one wheel brake cylinder is increased by the increased second internal pressure.

16 Claims, 4 Drawing Sheets

(51) Int. Cl.
*B60T 8/40* (2006.01)
*B60T 13/66* (2006.01)
*B60T 7/06* (2006.01)

(56) References Cited

U.S. PATENT DOCUMENTS

| | | | |
|---|---|---|---|
| 5,249,853 A * | 10/1993 | Reinartz et al. | 303/114.1 |
| 5,887,954 A | 3/1999 | Steiner et al. | |
| 5,971,499 A * | 10/1999 | Pape et al. | 303/9.61 |
| 6,227,628 B1 * | 5/2001 | Emmann et al. | 303/115.3 |
| 6,616,246 B1 * | 9/2003 | Williamson et al. | 303/9.62 |
| 7,922,264 B2 * | 4/2011 | Baumann et al. | 303/115.2 |
| 8,459,753 B2 * | 6/2013 | Vollert et al. | 303/114.1 |
| 8,468,820 B2 * | 6/2013 | Drumm | 60/545 |
| 2002/0158510 A1 * | 10/2002 | Kobayashi et al. | 303/155 |
| 2008/0210496 A1 | 9/2008 | Ishii | |
| 2009/0095100 A1 | 4/2009 | Toyohira et al. | |
| 2011/0297493 A1 * | 12/2011 | Vollert et al. | 188/106 R |
| 2012/0192556 A1 * | 8/2012 | Verhagen et al. | 60/585 |
| 2012/0205967 A1 * | 8/2012 | Mahnkopf | 303/2 |

FOREIGN PATENT DOCUMENTS

| | | |
|---|---|---|
| DE | 196 51 153 | 6/1998 |
| DE | 103 30 146 | 1/2005 |
| DE | 10 2007 019 441 | 10/2008 |
| DE | 10 2008 014 462 | 9/2009 |
| DE | 10 2009 047 263 | 6/2010 |
| EP | 2 048 569 | 4/2009 |
| JP | 3136965 | 2/1997 |
| JP | 2003-252198 | 9/2003 |
| JP | 2008-260351 | 10/2008 |
| JP | 2009-90932 | 4/2009 |
| JP | 2009-279966 | 12/2009 |
| WO | WO 2010/064526 | 10/2010 |

* cited by examiner

BRAKE SYSTEM FOR A VEHICLE AND METHOD FOR OPERATING A BRAKE SYSTEM FOR A VEHICLE

BACKGROUND OF THE INVENTION

1. Field of the Invention

The present invention relates to a brake system for a vehicle and a method for operating a brake system for a vehicle.

2. Description of the Related Art

Electric and hybrid vehicles have a brake system configured for regenerative braking, with an electric motor operated as a generator during regenerative braking. The electrical energy obtained during regenerative braking is preferably used, following temporary storage, for accelerating the vehicle. In that manner it is possible to reduce a power loss which is exhibited by a conventional vehicle in the case of frequent braking during a drive, and to reduce energy consumption and pollutant emissions of the electric or hybrid vehicle.

However, operation of the electric motor, for example the electric drive motor, as a generator normally requires a certain minimum speed of the vehicle. Therefore, a regenerative braking system is frequently not able to exert a generative braking torque on the wheels of the vehicle for a sufficiently long period before the vehicle traveling in front is at a standstill. For that reason, a hybrid vehicle often has, in addition to the regeneratively operated electric motor, a hydraulic brake system with which it is possible to compensate for the loss in braking effect of the regenerative brake, at least in a low speed range. In that case, even with a full electrical energy store, when the regenerative brake is usually not exerting any braking torque on the wheels, the entire braking torque may be applied via the hydraulic brake system.

On the other hand, in many situations, it is desirable to exert as small as possible a hydraulic braking force on the wheels in order to achieve a high degree of regeneration. For example, following gearshift operations, the uncoupled generator is frequently activated as a regenerative brake to ensure reliable charging of the temporary storage device and a high energy saving.

In general, a driver prefers an overall braking torque of his vehicle corresponding to his actuation of a brake input element, for example his actuation of the brake pedal, irrespective of activation or deactivation of the regenerative brake. Some electric and hybrid vehicles therefore have an automatic system that is intended to adapt the braking torque of the hydraulic brake system to the current braking torque of the regenerative brake in such a way that a desired overall braking torque is maintained. The driver does not, therefore, himself have to assume the function of deceleration controller by adapting the braking torque of the hydraulic brake system to the current braking torque of the regenerative brake by appropriate actuation of the brake input element.

Examples of such an automatic system are brake-by-wire systems, especially EHB systems. Owing to their complex electronics, mechanics and hydraulics, brake-by-wire systems are, however, relatively expensive.

Published German patent document DE 196 51 153 B4 describes a hydraulic brake system that includes four isolating valves, connected downstream of the master brake cylinder, for disconnection of the four wheel brake cylinders during braking by an external force. After disconnection of the four wheel brake cylinders from the master brake cylinder, a wheel brake pressure is said to be adjustable for each wheel individually in each of the four wheel brake cylinders with the aid of a brake assembly composed of a pump drive motor, at least one pump and at least one storage chamber. A generator braking torque of an on-board generator is said to be blendable in that manner. In addition, published German patent document DE 196 51 153 B4 describes a configuration of a master brake cylinder which is said to enable use of the master brake cylinder as a pedal simulator after disconnection of the four wheel brake cylinders.

BRIEF SUMMARY OF THE INVENTION

By virtue of the brake system being advantageously equipped with the second piston-cylinder unit and by virtue of the first brake booster being advantageously disposed at the second piston-cylinder unit, "decoupling" of the first brake booster from the first piston-cylinder unit is ensured. As will be explained in greater detail hereinafter, that "decoupling" of the brake boosting performed by the first brake booster from the first piston-cylinder unit is advantageous for active adjustment of the brake pressure in the at least one wheel brake cylinder. In particular, the "decoupling" makes it easier to blend at least one additional braking torque, such as, for example, a generator braking torque.

Despite the "decoupling" of the first brake booster from the first piston-cylinder unit, the first brake booster is able to fulfill the function of a standard brake booster in the brake system according to the invention. The first brake booster may therefore be used both as a brake booster and as a blending device for adapting the brake pressure in the at least one wheel brake cylinder to an additional (non-hydraulic) braking torque. The first brake booster in the brake system according to the invention accordingly has an enhanced multifuntionality in comparison with the functional capability or usability of a conventional hydraulic brake system. In particular, the first brake booster of the brake system according to the invention may also be used, in contrast to a conventional hydraulic brake system, for additionally increasing the at least one brake pressure. Owing to this mulltifunctionality of the first brake booster, the production costs for the brake system according to the invention may be reduced. At the same time, this multifunctionality of the first brake booster ensures that less space is required for installation of the brake system and hence that a vehicle may be more easily equipped with the advantageous brake system.

The present invention ensures an inexpensive brake system, in which, despite a time-varying additional braking torque, for example a regenerative braking torque, the overall braking torque of the brake system may be actively adjusted by way of the first brake booster to a preferred (time-constant) value. The possibility exists in this case of ascertaining, by using a sensor or by estimation, the overall braking torque desired by the driver and/or by an automatic speed control system of the vehicle and the (non-hydraulic) additional braking torque exerted by a regenerative brake, for example, on at least one wheel of the vehicle. It is then possible to ascertain the difference between the at least one exerted additional braking torque and the desired overall braking torque. A change in the brake pressure of the at least one wheel brake cylinder corresponding to the difference ascertained may thereafter be actively adjusted with the use of the first brake booster.

In that manner, blending of a regenerative braking torque, for example, is possible without the driver needing to make any additional effort to do so. No expensive electronics are necessary for carrying out the method steps described in the preceding paragraph. Accordingly, a sufficient regeneration efficiency is provided at reasonable cost when using the present invention.

The present invention is not, however, limited to use in an electric or hybrid vehicle. For example, a lateral-acceleration-dependent brake force distribution may be implemented with the aid of the present invention. In the case of a lateral-acceleration-dependent brake force distribution, the brake force is distributed to some of the wheels of the vehicle, preferably the two rear-axle wheels, according to a vertical force that occurs during cornering. In that manner it is possible to adjust the friction coefficient of the wheels, particularly the friction coefficient of the two rear wheels, to the lateral acceleration. The vehicle therefore brakes in a more stable manner on bends. Preferably, a lateral acceleration ascertained by a sensor device is used to ascertain the hydraulic braking torque which is to be actively adjusted by the first brake circuit.

In addition, use of the present invention for dynamic corner-braking is possible. In dynamic corner-braking, the braking force at a wheel on the inside of the bend is increased in comparison with the braking force at a wheel on the outside of the bend. This results in a more dynamic driving response.

Furthermore, the present invention may also be used for a more advantageous braking while driving in reverse. In particular, in this case, a brake force distribution that is better for driving in reverse is established by increasing the brake force at the rear axle. This is also referred to as "backward brake force distribution" This enables a markedly more stable driving response to be obtained, especially when backing up slowly downhill.

The present invention additionally offers a simple to operate and inexpensive alternative to a conventional brake-by-wire system, which is very advantageous particularly for rear-wheel drive and four-wheel drive vehicles. The present invention may also be used, however, for front-wheel drive with a by-wire front axle.

It is pointed out that the term "first brake booster" is not to be understood as meaning a specific type of brake booster. Instead, a device for applying an external force to the second piston of the second piston-cylinder unit may be understood as being a first brake booster. A master brake cylinder of a conventional type, for example, may be used both for the first piston-cylinder unit and for the second piston-cylinder unit. The brake system is not, however, limited to a specific type of master brake cylinder as the first piston-cylinder unit and/or as the second piston-cylinder unit.

The advantages of the brake system described in the foregoing paragraphs may also be obtained through the method according to the invention. Correspondingly, the method steps of the method may be carried out by embodiments of the brake system.

DETAILED DESCRIPTION OF THE INVENTION

Figure 1:
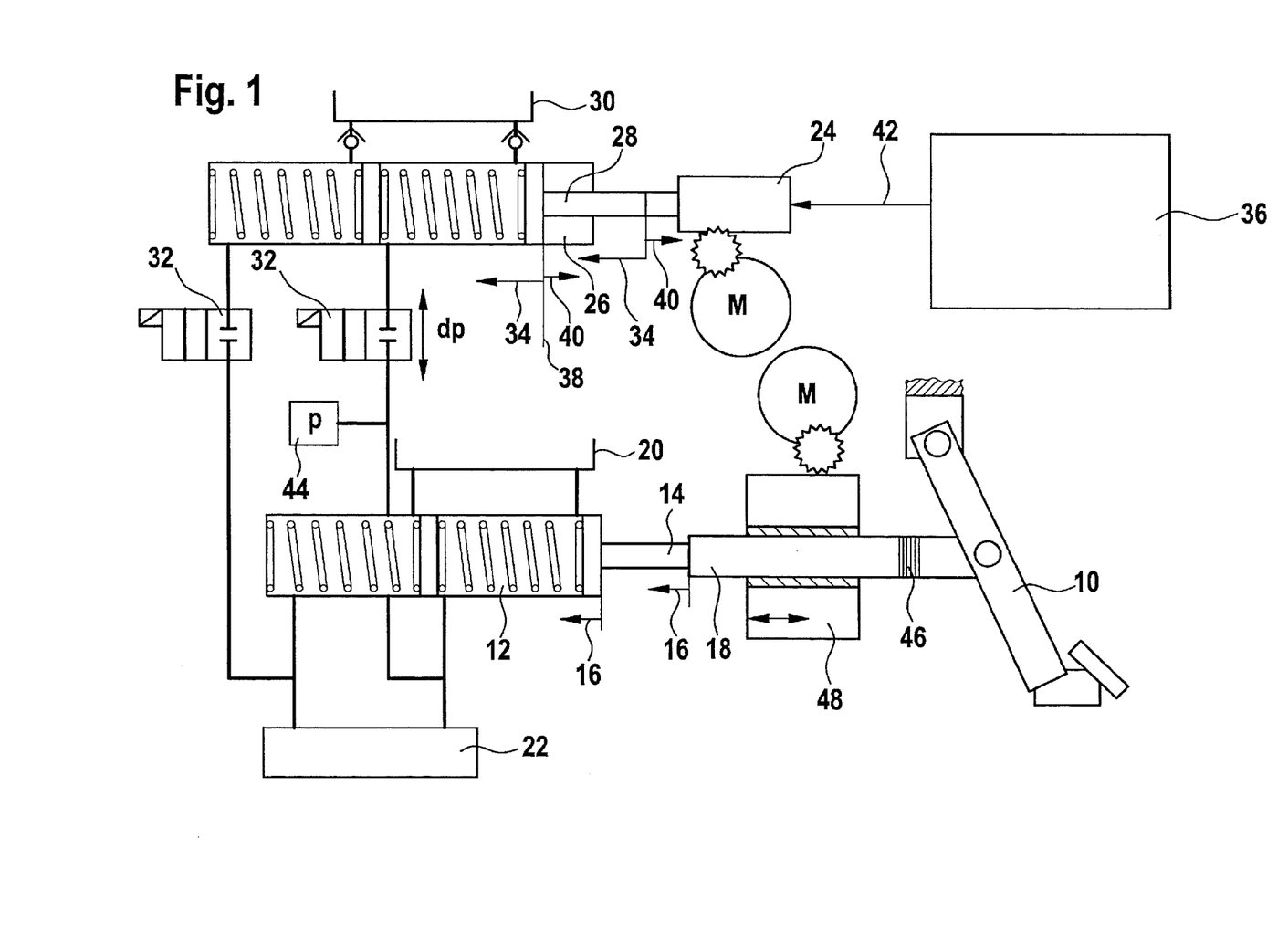
FIG. 1 shows a schematic illustration of a first embodiment of the brake system.

FIG. 1 shows a schematic illustration of a first embodiment of the brake system.

The brake system illustrated schematically in FIG. 1 has a brake actuating element 10 configured as a brake pedal. The brake system described hereinafter is not, however, limited to a configuration of brake actuating element 10 as a brake pedal. A first piston-cylinder unit 12 is disposed at brake actuating element 10 in such a way that a first piston 14 of first piston-cylinder unit 12 is displaceable by brake actuating element 10 actuated by at least a predefined minimum actuation. Actuation of brake actuating element 10 by at least a predefined minimum actuation may be understood as meaning, for example, displacement of brake actuating element 10 from its (non-actuating) starting position. Further possible forms of the predefined minimum actuation are described below.

First piston-cylinder unit 12 may, for example, be a master brake cylinder. In particular, first piston-cylinder unit 12 may be a tandem master brake cylinder (TMC). The design possibilities for first piston-cylinder unit 12 are not, however, limited to this configuration example. First piston-cylinder unit 12 may be connected to a brake medium reservoir 20 via at least one flow opening, such as, for example, a snifter bore.

On actuation of brake actuating element 10 by at least the predefined minimum actuation, first piston 14 may be displaced at least partially into first piston-cylinder unit 12 in a direction 16 away from brake actuating element 10. Advantageous displacement of first piston 14 by brake actuating element 10 actuated by at least the predefined actuation may be achieved, for example, by connecting brake actuating element 10 to a first contact part, for example an input rod 18. The first contact part of brake actuating element 10 is so disposed in relation to a second contact part of first piston 14 that the first contact part is moved with brake actuating element 10 actuated by at least the predefined minimum actuation in such a way that it contacts the second contact part (for example after displacement by a minimum contact part travel). The second contact part may, in particular, be a sub-unit of first piston 14. It is also possible, however, to use other components for the two contact parts, especially elements of a rotation-translation converter.

In the case of the illustrated embodiment, in its (non-actuating) starting position, input rod 18 contacts first piston 14. Accordingly, a slight displacement of brake actuating element 10 from its starting position already causes displacement of first piston 14 in direction 16. As will become clear hereinafter, the configuration of the brake system is not, however, limited to there being a force-transmitting contact between brake actuating element 10 and first piston 14 in the starting position of brake actuating element 10, that is, in the case of non-actuation of brake actuating element 10.

By displacement of first piston 14 it is possible to increase a first internal pressure in first piston-cylinder unit 12. The brake system may have at least one (schematically reproduced) brake circuit 22 having at least one wheel brake cylinder (not shown). The at least one wheel brake cylinder is in that case hydraulically connected to the first piston-cylinder unit in such a way that a brake pressure of the at least one wheel brake cylinder may be increased by way of the increased first internal pressure in first piston-cylinder unit 12. Thus, by increasing the brake pressure of the at least one wheel brake cylinder it is possible to build up a hydraulic braking torque on at least one wheel (not shown) of the vehicle. The brake system is not limited to a particular type of the at least one wheel brake cylinder for exerting on a wheel a hydraulic braking torque corresponding to the brake pressure nor to a specific hydraulic coupling of the at least one wheel brake cylinder to first piston-cylinder unit 12.

The brake system has at least one first brake booster 24 which is disposed at a second piston-cylinder unit 26. First brake booster 24 may, for example, be an electromechanical brake booster (having an electric motor M) or a hydraulic brake booster (i-booster). Preferably, brake booster 24 is configured as a brake booster that is continuously controllable by closed-loop/open-loop control (active brake booster). Instead of such a type of brake booster, it is also possible, however, to use an external force device of a different form.

A second piston 28 of second piston-cylinder unit 26 is displaceable by the first brake booster in such a way that a second internal pressure in second piston-cylinder unit 26 may be increased. The exemplary embodiments already listed above for first piston-cylinder unit 12 may be used for second piston-cylinder unit 26. Preferably, second piston-cylinder unit 26 also is connected to brake medium reservoir 20 or to a further brake medium reservoir 30 via at least one flow opening, such as, for example, a snifter bore.

In addition to being hydraulically coupled to first piston-cylinder unit 12, the at least one wheel brake cylinder of the at least one brake circuit 22 is preferably also hydraulically connected to second piston-cylinder unit 26 in such a way that the brake pressure of the at least one wheel brake cylinder may be increased by way of the increased second internal pressure in second piston-cylinder unit 26. Thus, the hydraulic braking torque of the at least one wheel brake cylinder of the at least one brake circuit 22 may also be actively adjusted to a preferred value by way of the second internal pressure in second piston-cylinder unit 26 being adjusted by first brake booster 24. In particular, in the case of the brake system illustrated here, the advantageous decoupling of first brake booster 24 from first piston-cylinder unit 12 is ensured. The advantages that may be thereby gained are discussed below.

The brake system has at least one isolating valve 32 with which at least the hydraulic connection between first piston-cylinder unit 12 and the at least one wheel brake cylinder of the at least one brake circuit 22 or the hydraulic connection between second piston-cylinder unit 26 and the at least one wheel brake cylinder of the at least one brake circuit 22 may be interrupted. Another way of describing this is to say that, by closing the at least one isolating valve 32, displacement of brake medium out of first piston-cylinder unit 12 via second piston-cylinder unit 26 into further brake medium reservoir 30 or out of second piston-cylinder unit 26 via first piston-cylinder unit 12 into brake medium reservoir 20 may be prevented/inhibited.

The brake system of FIG. 1 includes, owing to the configuration of the two piston-cylinder units 12 and 26 as tandem master brake cylinders, two lines each with an isolating valve 32 for hydraulic coupling of second piston-cylinder unit 26 to first piston-cylinder unit 12 and to the at least one brake circuit 22. By closing the two isolating valves 32, displacement of first piston 14 into first piston-cylinder unit 12 may be prevented from leading to displacement of the brake medium via second piston-cylinder unit 26 into further brake medium reservoir 30 or into brake medium reservoir 20. Thus, by closing the at least one isolating valve 32 it may be reliably ensured that displacement of first piston 14 into first piston-cylinder unit 12 results in a corresponding increase in the brake pressure of the at least one wheel brake cylinder.

Optionally, the brake system also has an additional braking device (not shown) with which at least one additional braking torque (in addition to the at least one hydraulic braking torque of the at least one wheel brake cylinder) may be exerted on at least one wheel of the vehicle. The additional braking device may be configured, for example, as a generator for a regenerative brake system. In that case, the at least one additional braking torque may include at least one generator braking torque.

Advantageously, the brake system also includes an evaluation and control device 36, with which it is possible to compensate at least partially for the at least one additional braking torque by using first brake booster 24. Preferably, the at least one evaluation and control device 36 is configured to completely blend the at least one additional braking torque by using first brake booster 24, so that a target deceleration of the vehicle, which is predefinable by the driver or by an automatic vehicle speed control, may be maintained even when the at least one additional braking torque changes with time.

In one advantageous embodiment, evaluation and control device 36 is configured to specify at least one target quantity in respect of the force of first brake booster 24 to be exerted on second piston 28, taking account of information provided relating to the at least one additional braking torque exerted on the at least one wheel of the vehicle. Such a target quantity may, for example, include a target revolution speed of a motor of first brake booster 24 and/or a target rotation direction. The specifiable target quantity is not, however, limited to the examples listed herein. After the at least one target quantity has been specified by evaluation and control device 36, first brake booster 24 may be activated by a control signal 24 corresponding to the specified target quantity in such a way that it carries out the blending described hereinafter.

In order for a brake pressure that has been built up by first piston-cylinder unit 12 in the at least one wheel brake cylinder to be reduced by a target pressure difference using first brake booster 24 and second piston-cylinder unit 26, by displacement of second piston 28 a volume of brake medium corresponding to the target pressure difference, especially a volume of brake medium corresponding to the at least one additional braking torque, may be drawn into second piston-cylinder unit 26. This may be achieved by providing second piston-cylinder unit 26 with an additional volume. Another way of describing this is to say that, at a second internal pressure in second piston-cylinder unit 26 corresponding to a hydraulic braking torque of the at least one wheel brake cylinder of zero, second piston 28 is in a starting position 38 with an additional volume. Second piston 28 is thus displaceable from the starting position 38 both at least partially into second piston-cylinder unit 26 in a first displacement direction 34 and at least partially out of second piston-cylinder unit 26 in a second displacement direction 40 which is preferably counter to first displacement direction 34.

Furthermore, first brake booster 24 may also be so configured and may be so activatable by control signal 42 that both a displacement force for displacing second piston 28 in first displacement direction 34 and a displacement force for displacing second piston 28 in second displacement direction 40 may be exerted by first brake booster 24. For blending of an additional braking torque that increases with time, second piston 28 may be displaced by first brake booster 24 in second displacement direction 40. By displacement of second piston 28 by first brake booster 24 in first displacement direction 34 it is possible to blend a decrease with time in the at least one additional braking torque. It is therefore possible to ensure that the time variation of the at least one additional braking torque does not lead or hardly leads to any change with time in the overall braking torque, made up of the at least one hydraulic braking torque and the at least one additional braking torque, which is exerted on the at least one wheel.

Optionally, the brake system may have at least one pressure sensor 44. Pressure sensor 44 may be connected upstream of the at least one isolating valve 32. The pressure prevailing in the at least one brake circuit 22 may therefore be ascertained by pressure sensor 44. A hydraulic braking torque of the at least one wheel brake cylinder corresponding to the prevailing pressure may thus be deduced in a simple manner.

Preferably, the brake system also includes a brake actuating element sensor 46. Brake actuating element sensor 46 may, for example, be a force sensor with which it is possible to ascertain the driver braking force exerted on brake actuating element 10. Instead of or in addition to a force sensor, a travel sensor may also be used to ascertain a sensor quantity relating to the actuation of brake actuating element 10, for example to ascertain a displacement travel of input rod 18. In that case, a braking instruction of the driver corresponding to the actuation of brake actuating element 10 may be ascertained as the target braking quantity by using brake actuating sensor element 46. The target braking quantity ascertained by brake actuating element sensor 46 may then be taken into account by evaluation and control device 36 to specify a force to be exerted on second piston 28 by first brake booster 24.

The brake system reproduced in FIG. 1 is operable in a plurality of operating modes.

In a first operating mode (unboosted braking mode), the hydraulic braking torque of the at least one wheel brake cylinder may be built up/adjusted exclusively by way of a driver braking force exerted on brake actuating element 10 by a driver. Thus, after a (partial) inactivation/a failure of the electronics, the driver still has the possibility of stopping the vehicle by making a direct braking input into the at least one brake circuit 22 by applying the driver braking force to brake actuating element 10. The brake system is switched to the first operating mode by closing of the at least one isolating valve 32.

Preferably, the at least one isolating valve 32 is configured as a de-energized closed valve. In that case, failure of the electronics causes automatic closing of the at least one isolating valve 32 and switching of the brake system into the first operating mode. This ensures an intensified braking action by the driver braking force exerted on brake actuating element 10 despite failure of the electronics of the vehicle. The brake system reproduced in FIG. 1 accordingly has an advantageous safety standard.

In a second operating mode of the brake system (boosting mode), the at least one isolating valve 32 is opened for actively increasing the brake pressure of the at least one wheel brake cylinder by using first brake booster 24. For increasing the brake pressure of the at least one wheel brake cylinder, which is built up by actuation of brake actuating element 10, second piston 28 of second piston-cylinder unit 26 is displaced by first brake booster 24 in first displacement direction 34 at least partially into second piston-cylinder unit 26. Thus, the driver does not himself have to exert the force to be applied to build up a target hydraulic braking torque on brake actuating element 10 completely as driver braking force. The use of first brake booster 24 thus makes it possible advantageously to relieve the burden on the driver when braking the vehicle and/or to achieve faster braking of the vehicle.

In a preferred embodiment, evaluation and control device 36 is configured in the second braking mode to activate first brake booster 24 by way of control signal 42 taking into account the target braking quantity specified by the driver. For example, the force with which first brake booster 24 displaces second piston 28 in first displacement direction 34 may correspond to a product of the driver braking force and a predefined factor. Brake actuating element sensor 46 which has already described may be used for that purpose. The open-loop/closed-loop control of first brake booster 24 by evaluation and control device 36 may be performed using a characteristic curve of the brake system. The characteristic curve used in this case may be ascertained by evaluation and control device 36 by way of an active intervention of first brake booster 24 with at least one isolating valve 32 closed.

In the third operating mode (blending mode), evaluation and control device 36 is configured to activate first brake booster 24 by way of control signal 42 taking into account (in addition) the information provided relating to the at least one additional braking torque. It is also possible in this case to take into account a target braking quantity provided by brake actuating element sensor 46. Regarding further details, reference is made to the remarks made above concerning evaluation and control device 36.

In an advantageous development, the brake system has a second brake booster 48 with which a simulation force opposing the actuation of the brake actuating element may be exerted on brake actuating element 10 and/or an assistance force corresponding to the actuation of brake actuating element 10 may be exerted on first piston 14 of first piston-cylinder unit 12. Preferably, second brake booster 48 is configured in the second operating mode (booster mode) to provide a force directed at least partially in direction 16 to additionally press first piston 16 into first piston-cylinder unit 12. Thus, the burden on the driver when braking the vehicle may be additionally relieved.

In the third operating mode (blending mode), on the other hand, second brake booster 48 may be used to exert the simulation force opposing the actuation of brake actuating element 10 on brake actuating element 10, especially on input rod 18. Since blending of an increase with time of the at least one additional braking torque leads to a decrease in the at least one hydraulic braking torque, the restoring force of first piston-cylinder unit 12, which opposes the displacement of first piston 14 in direction 16, also decreases. To prevent the decrease in the restoring force being perceived by the driver as a change in the feel of the brakes (the feel of the pedal), the decrease in the restoring force may be at least slightly offset by a simulation force of second brake booster 48 which is directed at least partially counter to direction 16. This causes an improved feel of the brakes (feel of the pedal) for the driver when actuating brake actuating element 10. In particular, the decrease in the restoring force may be compensated for by way of a simulation force exerted by second brake booster 48. In this case, the driver notices neither a variation with time of the at least one additional braking torque nor a blending of the variation with time.

Advantageously, second brake booster 48 may be used in such a way that the force that is to be exerted on brake actuating element 10 by the driver corresponds to a conventional braking characteristic (pedal characteristic). For activating second brake booster 48 accordingly, it is possible to use, for example, evaluation and control device 36. For further improvements, the characteristics of the two piston-cylinder units 12 and 26 may be selected in such a way that the force opposing the actuation of brake actuating element 10 corresponds to a conventional (advantageous) braking characteristic (pedal characteristic).

The brake system may be additionally optimized by specifying the "displaceable braking areas" of the two piston-cylinder units 12 and 26. For example, the displaceable braking area of second piston-cylinder unit 26 may be distinctly smaller than the displaceable braking area of first piston-cylinder unit 12. In that case, a model having a relatively low applicable maximum force may be used for first brake booster 24 while a model having comparatively low dynamics may be used for second brake booster 48. Despite these inexpensive models of brake boosters 24 and 48, the brake system is able to exhibit the relatively high dynamics of first brake booster 24 and the relatively high force-boosting of second brake booster 48.

Correspondingly, the displaceable braking area specified for second piston-cylinder unit 26 may be distinctly greater than the displaceable braking area specified for first piston-cylinder unit 12. In that case, first brake booster 24 is of a good configuration for use as a brake booster. Second brake booster 48 has a particularly advantageous suitability as an active pedal simulator.

FIGS. 2A through 2D show a schematic illustration and three coordinate systems to explain a second embodiment of the brake system.

Figure 2A:
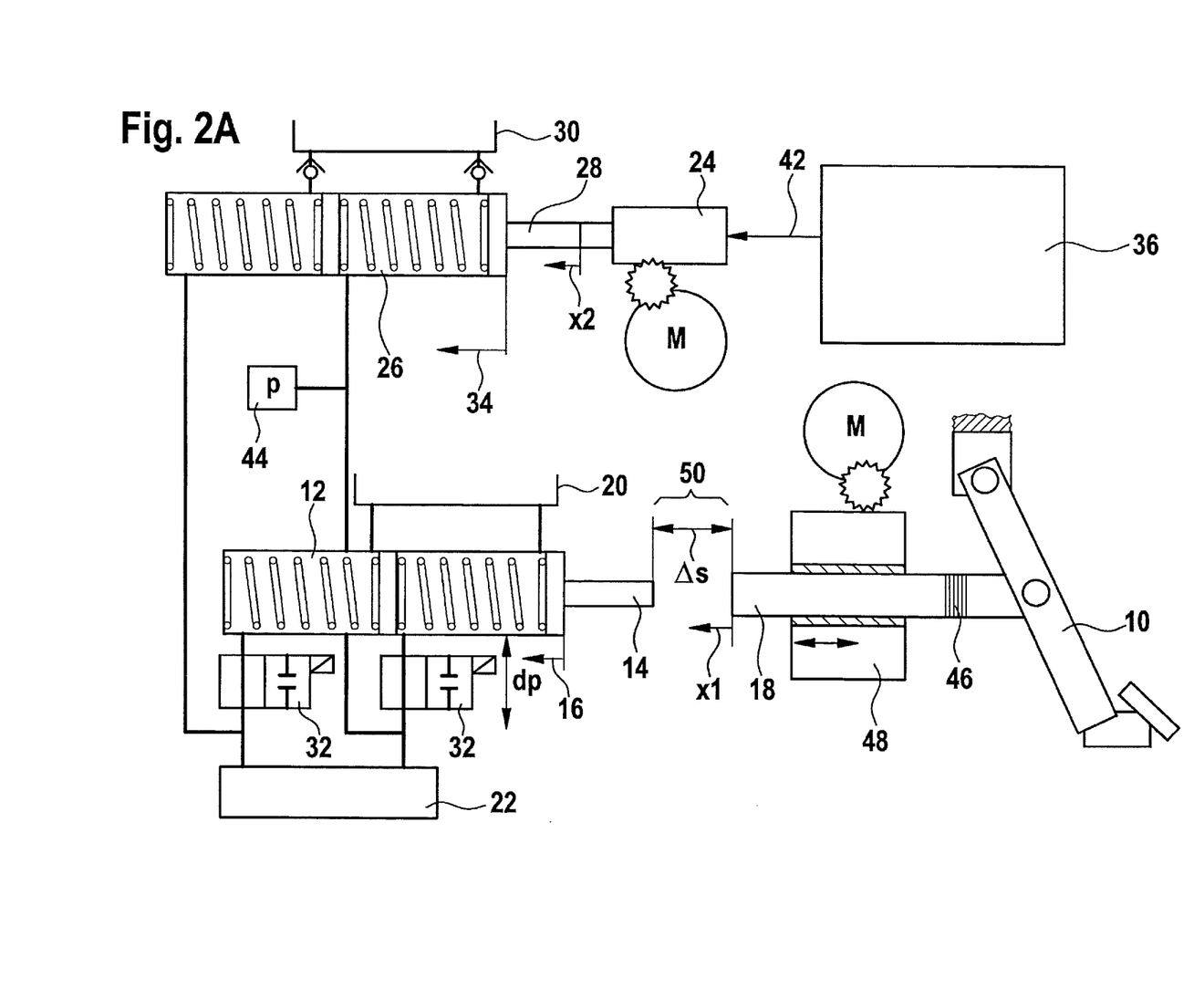
FIGS. 2A through 2D show a schematic illustration and three coordinate systems to explain a second embodiment of the brake system.

In contrast to the brake system described above, in the case of the embodiment shown here the at least one isolating valve 32 is connected upstream of first piston-cylinder unit 12. The hydraulic coupling of first piston-cylinder unit 12 to second piston-cylinder unit 26 and the at least one brake circuit 22 may therefore be blocked by closing the at least one isolating valve 32. By closing the at least one isolating valve 32 it is possible to prevent a volume of brake medium from flowing out of second piston-cylinder unit 26 into brake medium reservoir 20 via first piston-cylinder unit 12 when first piston 14 is in its (no-force) starting position. Thus, after closing of the at least one isolating valve 32, first brake booster 24 may be used to increase the brake pressure of the at least one wheel brake cylinder despite first piston 14 being in its starting position. In addition, in the case of the embodiment illustrated here, it is possible to dispense with providing second piston-cylinder unit 26 with an additional volume.

In the case of the embodiment reproduced schematically in FIG. 2A, the first contact part of brake actuating element 10, which contact part is configured as input rod 18, does not contact the second contact part, configured as an end portion of first piston 14, until brake actuating element 10 is displaced out of its (non-actuating) starting position by at least a predefined minimum actuation travel not equal to zero. In the case of displacement of brake actuating element 10 out of its (non-actuating) starting position by an actuation travel that is less than the minimum actuation travel, the first contact part is so spaced from the second contact part that force transmission from the first contact part to the second contact part is prevented.

This may be achieved by spacing the first contact part (output rod 18), in its (non-actuating) starting position, from the second contact part by a gap 50 (air gap). Accordingly, only displacement of the first contact part in direction 16 away from brake actuating element 10 by at least a displacement travel x1 equal to an idle travel Δs causes force-transmitting contact between brake actuating element 10 and first piston 14. The predefined minimum actuation travel corresponds in this case to the idle travel Δs not equal to zero. The idle travel is may be equal to the maximum width of gap 50.

Thus, when brake actuating element 10 is displaced out of its starting position by an actuation travel below the minimum actuation travel, or on actuation of brake actuating element 10 below the predefined minimum actuation, the brake system is in a decoupling mode in which brake actuating element 10 is "decoupled/uncoupled" from first piston-cylinder unit 12. Thus, it is ensured in the decoupling mode that displacement of brake actuating element 10 out of its (non-actuating) starting position by an actuation travel below the minimum actuation travel does not lead to an increase in the internal pressure in first piston-cylinder unit 12, and therefore does not lead to an increase in the brake pressure of the at least one wheel brake cylinder of the at least one brake circuit 22.

The "decoupling" from first piston-cylinder unit 12 of brake actuating element 10 displaced out of its starting position by an actuation travel below the minimum actuation travel may be employed for advantageously utilizing an additional (non-hydraulic) braking device, for example a generator. In particular, it is possible to ensure in this manner that the vehicle deceleration carried out does not exceed a target deceleration specified by the driver. The gap 50 may have a maximum width that ensures an idle travel Δs of at least one maximum additional braking torque. In that manner it is possible to implement an additional braking torque of from 0.3 g to 0.5 g without exceeding the target deceleration specified by the driver.

If the additional braking torque exerted deviates from the target deceleration specified by the driver by actuating brake actuating element 10, first brake booster 24 may be used, after closing of the at least one isolating valve 32, for actively adjusting at least one advantageous hydraulic braking torque of the at least one wheel brake cylinder. Advantageously, evaluation and control device 36 is configured to specify the target quantity in respect of the force to be applied to second piston 28 by the second brake booster taking account of the target deceleration provided, for example, as a target braking quantity by brake actuating element sensor 46 and taking account of information provided relating to the at least one additional braking torque. The force exerted on second piston 28 by first brake booster 24 may, in particular, correspond to a difference by which the at least one additional braking torque is below the target deceleration. The target deceleration specified by the driver may thus be reliably maintained. In particular, despite the target deceleration specified by the driver being reliably maintained and despite a relatively small force exerted on second piston 28 by first brake booster 24, comparatively high additional braking torques may be exerted on at least one wheel. The "quasi-blending" of the comparatively high additional braking torques which is described here thus requires only comparatively low energy consumption by first brake booster 24.

In order to ensure that the driver has an advantageous (standard) feel of the brakes (feel of the pedal) despite the "decoupling" from first piston-cylinder unit 12 of brake actuating element 10 displaced out of its starting position by an actuation travel below the minimum actuation travel, it is possible to use second brake booster 48 as a pedal simulator in the manner already described above.

By actuation of brake actuating element 10 by at least the predefined minimum actuation, or by displacement of brake actuating element 10 out of its starting position by at least the minimum actuation travel, the brake system is automatically changed to a coupling mode. In the coupling mode, the driver is able to make a braking input directly into the at least one wheel brake cylinder by actuating brake actuating element 10. First brake booster 24 and optionally second brake booster 48 may be used in the coupling mode for additionally increasing the brake pressure of the at least one wheel brake cylinder in the manner already described above.

The brake system described herein may be implemented with high dynamics and good force boosting even though a model having a relatively small applicable maximum force is usable as first brake booster 24 and a model having comparatively low dynamics is usable as second brake booster 48. For additional optimization, the displaceable braking area of second piston-cylinder unit 26 may be smaller than the displaceable braking area of first piston-cylinder unit 12.

As an alternative to this, the displaceable braking area of second piston-cylinder unit 26 may also be larger than the displaceable braking area of first piston-cylinder unit 12. In that case, the first brake booster is especially advantageously configured as a brake booster while second brake booster 48 is very suitable as an active pedal simulator.

Preferably, the at least one isolating valve 32 is configured as a de-energized open valve. Failure of the electronics causes automatic opening of the at least one isolating valve 32. Thus, in such a situation, the driver is automatically able to make a braking input directly in the at least one wheel brake cylinder by actuating brake actuating element 10.

Figure 2B:
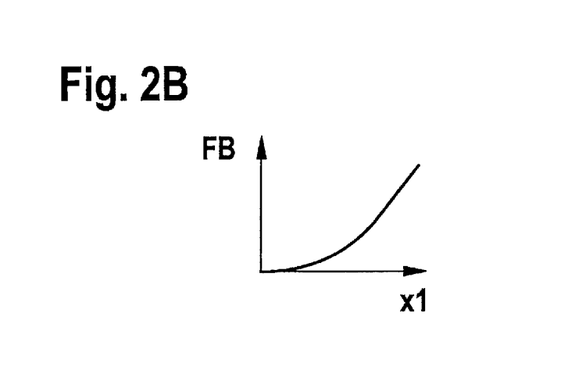

In the coordinate system of FIG. 2B, the abscissa corresponds to the displacement travel x1 of input rod 18 on actuation of brake actuating element 10. The ordinate indicates the driver braking force FB that is to be applied to brake actuating element 10 for that purpose. It will be seen that, by using second brake booster 48, it is possible to ensure a standard braking characteristic (pedal characteristic) even without force-transmitting contact between input rod 18 and first piston 14.

Figure 2C:
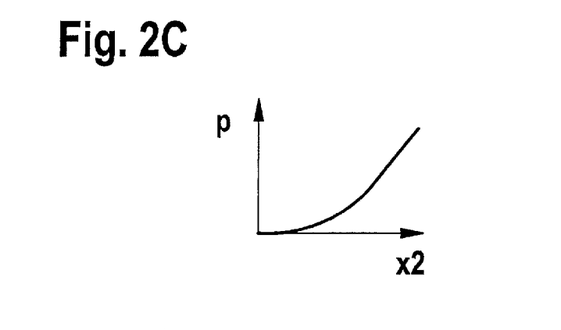

The coordinate system shown in FIG. 2C describes a relationship between an assistance travel x2 of first brake booster 24 for displacing second piston 28 and a pressure p, resulting from a function of first brake booster 24, in the at least one brake circuit 22. The abscissa shows the assistance travel x2, while the ordinate indicates the resulting pressure p.

As will be seen, by displacement of second piston 28 by first brake booster 24 by an assistance travel x2 it is possible to build up an advantageous increase in pressure p in the at least one wheel brake cylinder of the at least one brake circuit 22. Pressure p in the at least one brake circuit 22 may be measured by pressure sensor 44, for example.

Figure 2D:
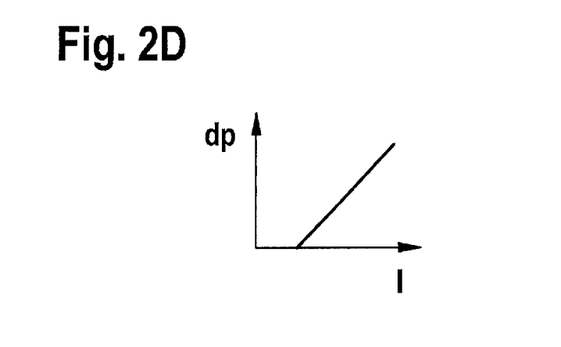

The ordinate of the coordinate system of FIG. 2D indicates a current I that may be applied to the at least one isolating valve 32. The abscissa of the coordinate system of FIG. 2D shows the pressure difference dp between an internal pressure in second piston-cylinder unit 26 and an internal pressure in first piston-cylinder unit 12, which may be produced by supplying current to the at least one isolating valve 32.

Figure 3:
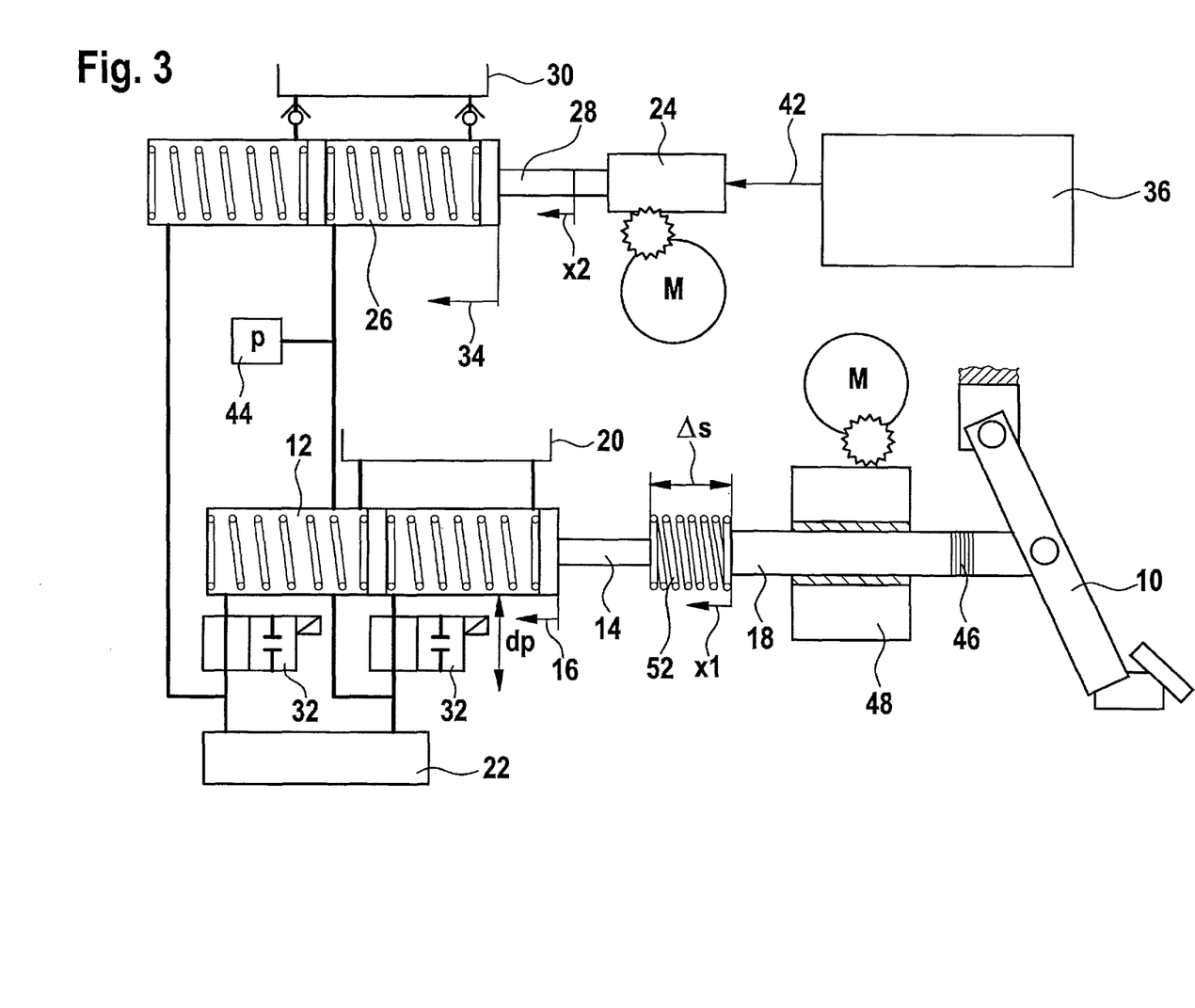
FIG. 3 shows a schematic illustration of a third embodiment of the brake system.

FIG. 3 shows a schematic illustration of a third embodiment of the brake system.

In the case of the third embodiment of the brake system shown schematically, brake actuating element 10 is connected to first piston 14 of first piston-cylinder unit 12 by way of a spring device 52. Spring device 52 may, for example, be a spring extending from an end of input rod 18 remote from brake actuating element 10 to an end of first piston 12 toward brake actuating element 10. Instead of an individual spring, however, it is also possible for spring structures having a plurality of springs to be used as spring device 52.

The spring constant of spring device 52 may be selected in such a way that light actuation of brake actuating element 10 causes slight displacement of first piston 14 into first piston-cylinder unit 12. By that slight displacement of first piston 14 into first piston-cylinder unit 12 it is possible to close the flow openings, configured, for example, as snifter bores, between first piston-cylinder unit 12 and brake medium reservoir 20.

After closing of the at least one flow opening between first piston-cylinder unit 12 and brake medium reservoir 20, the at least one isolating valve 32 may be closed. After closing of the at least one isolating valve 32, light further actuation of brake actuating element 10 already causes a (rapid) pressure build-up in the interior of first piston-cylinder unit 12. The (rapid) pressure build-up is associated with a (rapid) increase in a restoring force opposing the inward displacement of first piston 14. At and above a restoring force greater than a spring force opposing compression of spring device 52, further actuation of brake actuating element 10 causes compression of the at least one spring device 52, in which case first piston 14 is not pushed or is hardly pushed into piston-cylinder unit 12. Thus, by closing of the at least one isolating valve 32, the brake system is changed to the decoupling mode already described above. The decoupling mode may be employed, in the manner already described above, for advantageously utilizing an additional (non-hydraulic) braking device. Optionally, the second brake booster may be used in that case to provide the simulation force already described above.

As an alternative to this, the at least one isolating valve connected upstream of first piston-cylinder unit 12 may also be controlled in an open state during light actuation of brake actuating element 10. In that case, actuation of brake actuating element 10 does not cause or hardly causes any compression of spring device 52, but causes displacement of first piston 14 into first piston-cylinder unit 12. Thus, in the case of the brake system described here, the driver also has the possibility of already making a braking input directly/actively into the at least one brake circuit 22 during the light actuation of brake actuating element 10 (coupling mode). At the same time, first brake booster 24 may be used for additionally increasing the brake pressure of the at least one wheel brake cylinder of the at least one brake circuit 22.

Preferably, the at least one isolating valve 32 is configured as a de-energized open valve. In that case, the at least one isolating valve 32 is automatically switched to the open state if the electronics of the brake system fail. Thus, in the event of failure of the electronics, the driver is already able to actively make a braking input into the at least one wheel brake cylinder of the at least one brake circuit 22 during the light actuation of brake actuating element 10. The driver is therefore still able to bring the vehicle to a standstill by applying a comparatively low force, despite the failed electronics. In particular, spring device 52 may be configured in such a way that the pedal travel of the brake system for braking the vehicle is not longer or is hardly longer than a conventional pedal travel.

It is pointed out that equipping the illustrated brake system with second brake booster 48 is merely optional. Instead, spring device 52 may also be configured in such a way that the spring force opposing compression of spring device 52 in the decoupling mode has a force-travel characteristic that corresponds to a preferred (standard) braking characteristic (pedal characteristic). The brake system described herein may thus be implemented at reasonable cost.

In the case of the embodiment of the brake system illustrated in FIG. 3 also, there is the possibility of specifying the displaceable braking areas of piston-cylinder units 12 and 26 in such a way that an inexpensive model may be used for the at least one brake booster 24 and 48. In that regard, reference is made to the foregoing remarks.

In the case of the brake system described above, the fixed relationship of a conventional brake system between an actuation travel of brake actuating element 10 and the volume of hydraulic fluid displaced in the master brake cylinder may be replaced by a variable relationship. Brake boosters 24 and 48, for example electromechanical brake boosters or hydraulic brake boosters, which are hydraulically coupled to each other may be capable of being actuated independently of each other. Depending on a preferred operating state of the brake system, the two brake boosters 24 and 48 may be actuated in the same or opposite direction to each other.

By virtue of their series-connected brake boosters 24 and 48, the brake systems described above are advantageously capable of being utilized as regenerative brake systems. In particular, the two brake boosters 24 and 48 may be connected to each other via a connecting element having an idle travel that is lockable where applicable. Depending on the operating state of the vehicle, second brake booster 48 may optionally be used as a pedal simulator, so that the multifunctionality of optional second brake booster 48 makes it possible to ensure an advantageous feel of the brakes (feel of the pedal).

Brake systems equipped with two piston-cylinder units 12 and 26 and two brake boosters 24 and 48 have the advantage of two largely identical sub-systems and of multiple use of components depending on operating states of the brake system. They may therefore be implemented at reasonable cost.

The brake systems described in the foregoing paragraphs are configured to carry out method steps of the method for operating a brake system for a vehicle. Hence, the method steps that may be carried out have already been described above. A description of the method for operating a brake system will therefore be dispensed with here.

What is claimed is:

1. A brake system for a vehicle, comprising:
    a brake actuating element;
    a first piston-cylinder unit, wherein the brake actuating element is disposed at the first piston-cylinder unit in such a way that a first piston of the first piston-cylinder unit is displaced by actuation of the brake actuating element by at least a predefined minimum actuation so that a first internal pressure in the first piston-cylinder unit is increased;
    at least one wheel brake cylinder hydraulically connected to the first piston-cylinder unit in such a way that a brake pressure of the at least one wheel brake cylinder is increased using the increased first internal pressure in the first piston-cylinder unit;
    a first brake booster;
    a second piston-cylinder unit, wherein the first brake booster is disposed at the second piston-cylinder unit in such a way that a second piston of the second piston-cylinder unit is displaced by the first brake booster so that a second internal pressure in the second piston-cylinder unit is increased, and wherein the at least one wheel brake cylinder is hydraulically connected to the second piston-cylinder unit in such a way that the brake pressure of the at least one wheel brake cylinder is increased using the increased second internal pressure in the second piston-cylinder unit; and
    an evaluation-and-control device that specifies a target force of the first brake booster applied to the second piston of the second piston-cylinder unit, wherein the target force does not influence a brake pressure increase produced by the first piston-cylinder unit.

2. The brake system as recited in claim 1, further comprising:
    at least one isolating valve controllable into a closed state, wherein a displacement of brake medium at least one of (i) from the first piston-cylinder unit into the second piston-cylinder unit, and (ii) from the second piston-cylinder unit into the first piston-cylinder unit, is prevented by the at least one isolating valve controlled into the closed state.

3. The brake system as recited in claim 2, wherein at least in one operating mode of the brake system, a driver braking force exerted on the brake actuating element is transmitted to the first piston via the brake actuating element displaced by at least a predefined minimum actuation travel not equal to zero as the minimum actuation, and a force transmission to the first piston from the brake actuating element displaced by less than the predefined minimum actuation travel is prevented.

4. The brake system as recited in claim 3, wherein the target force is specified taking into account information relating to at least one additional braking torque exerted on at least one wheel of the vehicle in addition to the at least one hydraulic braking torque of the at least one wheel brake cylinder, and wherein the evaluation-and-control device activates the first brake booster to apply the specified target force.

5. The brake system as recited in claim 4, wherein the at least one additional braking torque includes at least one generator braking torque.

6. The brake system as recited in claim 4, wherein the evaluation-and-control device activates the first brake booster such that a volume of brake medium corresponding to an increase over time of the at least one additional braking torque is drawn into the second piston-cylinder unit by the displaced second piston.

7. The brake system as recited in claim 4, further comprising:
    at least one brake actuating element sensor, wherein a target braking quantity corresponding to the actuation of the brake actuating element is specified with the use of the at least one brake actuating element sensor, and wherein the target force to be applied to the second piston of the second piston-cylinder unit is specified with the use of the evaluation-and-control device, taking the target braking quantity additionally into account.

8. The brake system as recited in claim 3, further comprising:
    a first contact part connected to the brake actuating element and disposed in relation to a second contact part of the first piston in such a way that (i) the first contact part connected to the brake actuating element displaced by less than the predefined minimum actuation travel is spaced from the second contact part, and (ii) the first contact part connected to the brake actuating element displaced by at least the predefined minimum actuation travel contacts the second contact part.

9. The brake system as recited in claim 3, wherein the brake actuating element is connected to the first piston of the first piston-cylinder unit via a spring device.

10. The brake system as recited in claim 3, further comprising:
    a second brake booster, wherein the second brake booster exerts at least one of (i) a simulation force opposing the actuation of the brake actuating element on the brake actuating element, and (ii) an assistance force corresponding to the actuation of the brake actuating element on the first piston of the first piston-cylinder unit.

11. A method for operating a brake system for a vehicle having a brake actuating element, a first brake booster, a first piston-cylinder unit hydraulically connected to at least one wheel brake cylinder, and a second piston-cylinder unit hydraulically connected to the at least one wheel brake cylinder, the method comprising:
    displacing a first piston of the first piston-cylinder unit by the brake actuating element actuated by at least a predefined minimum actuation such that a first internal pressure in the first piston-cylinder unit and a brake pressure of the at least one wheel brake cylinder are increased;
    specifying, by an evaluation-and-control device, a target force of the first brake booster applied to a second piston of the second piston-cylinder unit, wherein the target force does not influence a brake pressure increase produced by the first piston-cylinder unit; and
    increasing the brake pressure of the at least one wheel brake cylinder by displacing the second piston of the second piston-cylinder unit hydraulically connected to the at least one wheel brake cylinder, with the use of the first brake booster.

12. The method as recited in claim 11, further comprising:
    ascertaining information relating to at least one additional braking torque which is exerted on at least one wheel of the vehicle in addition to the at least one hydraulic braking torque of the at least one wheel brake cylinder;

specifying the target force of the first brake booster to be applied to the second piston of the second piston-cylinder unit, taking into account the ascertained information relating to the at least one additional braking torque; and activating the first brake booster such that the specified target force of the first brake booster is applied to the second piston of the second piston-cylinder unit.

13. The method as recited in claim 12, further comprising:

specifying a target braking quantity relating to a target deceleration of the vehicle taking account of the actuation of the brake actuating element by a driver;

wherein the target force of the first brake booster is applied to the second piston of the second piston-cylinder unit, taking the specified target braking quantity additionally into account.

14. The method as recited in claim 13, wherein the target quantity is specified taking into account a difference between the target deceleration of the vehicle, corresponding to the specified target braking quantity, and the at least one additional braking torque.

15. The method as recited in claim 12, wherein the first brake booster is activated to apply the specified target force such that by displacement of the second piston a volume of brake medium corresponding to an increase over time of the at least one additional braking torque is drawn into the second piston-cylinder unit.

16. A brake system for a vehicle, comprising:

a brake actuating element;

a first piston-cylinder unit, wherein the brake actuating element is disposed at the first piston-cylinder unit in such a way that a first piston of the first piston-cylinder unit is displaced by actuation of the brake actuating element by at least a predefined minimum actuation so that a first internal pressure in the first piston-cylinder unit is increased;

at least one wheel brake cylinder hydraulically connected to the first piston-cylinder unit in such a way that a brake pressure of the at least one wheel brake cylinder is increased using the increased first internal pressure in the first piston-cylinder unit;

a first brake booster;

a second piston-cylinder unit, wherein the first brake booster is disposed at the second piston-cylinder unit in such a way that a second piston of the second piston-cylinder unit is displaced by the first brake booster so that a second internal pressure in the second piston-cylinder unit is increased, and wherein the at least one wheel brake cylinder is hydraulically connected to the second piston-cylinder unit in such a way that the brake pressure of the at least one wheel brake cylinder is increased using the increased second internal pressure in the second piston-cylinder unit; and an isolating valve controllable into a closed state, wherein:

the isolating valve hydraulically connects the first piston-cylinder unit to the second piston-cylinder unit such that a displacement of brake medium at least one of (i) from the first piston-cylinder unit into the second piston-cylinder unit, and (ii) from the second piston-cylinder unit into the first piston-cylinder unit, is prevented when the isolating valve is in the closed state; and opening and closing of the isolating valve switches between (i) a first operating mode in which a hydraulic braking torque of the at least one wheel brake cylinder is produced exclusively by a driver braking force exerted on the brake actuating element, and (ii) a second operating mode in which, in addition to the driver braking force, the hydraulic braking torque of the at least one wheel brake cylinder is increased through displacement of the second piston of the second piston-cylinder unit.

\* \* \* \* \*